US012558808B2

(12) United States Patent
Torrenga

(10) Patent No.: US 12,558,808 B2
(45) Date of Patent: Feb. 24, 2026

(54) BLADE ASSEMBLY AND RETRACTION MECHANISM FOR A HIGH-SPEED FOOD SLICING APPARATUS

(71) Applicant: Provisur Technologies, Inc., Chicago, IL (US)

(72) Inventor: Ryan Michael Torrenga, Bourbonnais, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 573 days.

(21) Appl. No.: 18/045,901

(22) Filed: Oct. 12, 2022

(65) Prior Publication Data

US 2023/0128556 A1 Apr. 27, 2023

Related U.S. Application Data

(60) Provisional application No. 63/271,459, filed on Oct. 25, 2021.

(51) Int. Cl.
*B26D 7/26* (2006.01)
*B26D 1/00* (2006.01)
(Continued)

(52) U.S. Cl.
CPC ......... *B26D 7/2614* (2013.01); *B26D 1/0006* (2013.01); *B26D 1/06* (2013.01);
(Continued)

(58) Field of Classification Search
CPC .... B26D 2210/08; B26D 1/157; B26D 7/325; B26D 2210/02; B26D 7/0625;
(Continued)

(56) References Cited

U.S. PATENT DOCUMENTS 2,036,012 A 3/1936 Bellinghausen
2,347,818 A 5/1944 Folk
(Continued)

FOREIGN PATENT DOCUMENTS

AU 200111314 A1 5/2001
AU 2013202066 A1 10/2013
(Continued)

OTHER PUBLICATIONS

DE-102016003938-A1 English Translation; Oct. 12, 2017; Schindler.*
(Continued)

*Primary Examiner* — Laura M Lee
(74) *Attorney, Agent, or Firm* — KLINTWORTH & ROZENBLAT LLP

(57) ABSTRACT

A food slicing system having a main frame includes a blade reciprocating assembly, which further includes a support frame, a rotating cutting blade mounted to the support frame, a motor mounted on the support frame, and a support shaft operatively coupled to the main frame at opposite ends thereof. The support shaft is coupled to an upper portion of the support frame and is configured to support the support frame and permit pivotal movement of the support frame. A drive shaft is operatively coupled to the main frame and is rotationally driven by an actuator. A plurality of linkage elements are configured to operatively couple the drive shaft to a lower portion of the support frame, where the linkage elements reciprocally move the blade reciprocating assembly between a slicing position and a clearance position, and where the support frame pivots about the support shaft during the reciprocal movement.

18 Claims, 10 Drawing Sheets

(51) Int. Cl.

| | |
|---|---|
| ***B26D 1/06*** | (2006.01) |
| ***B26D 1/28*** | (2006.01) |
| ***B26D 5/00*** | (2006.01) |
| ***B26D 5/22*** | (2006.01) |
| ***B26D 5/42*** | (2006.01) |
| ***B26D 7/00*** | (2006.01) |
| ***B26D 7/01*** | (2006.01) |
| ***B26D 7/06*** | (2006.01) |
| ***B26D 7/32*** | (2006.01) |

(52) U.S. Cl.
CPC ............... *B26D 5/007* (2013.01); *B26D 5/22* (2013.01); *B26D 5/42* (2013.01); *B26D 7/01* (2013.01); *B26D 7/0608* (2013.01); *B26D 7/0625* (2013.01); *B26D 7/0633* (2013.01); *B26D 7/0641* (2013.01); *B26D 7/32* (2013.01); *B26D 2001/0013* (2013.01); *B26D 2001/0046* (2013.01); *B26D 1/28* (2013.01); *B26D 2007/0018* (2013.01); *B26D 2210/02* (2013.01)

(58) Field of Classification Search
CPC ............. Y10T 83/7751; Y10T 83/7838; Y10T 83/7834; Y10T 83/7847
See application file for complete search history.

(56) References Cited

U.S. PATENT DOCUMENTS 2,714,574 A 8/1955 Kearney
3,080,784 A * 3/1963 Schneider ................ B26D 5/06 83/575
3,105,433 A 10/1963 Yerex et al.
3,179,039 A 4/1965 Christensen
3,667,521 A 6/1972 Beasley
3,842,260 A 10/1974 Christensen et al.
3,846,958 A 11/1974 Divan
3,892,156 A * 7/1975 Johnstone ............ B23D 35/004 83/482
3,894,457 A 7/1975 Miller et al.
3,901,140 A 8/1975 Dohm, Jr.
3,982,299 A 9/1976 Kompan
3,990,336 A 11/1976 Soodalter
4,119,004 A 10/1978 Ludwig
4,179,985 A 12/1979 Baker et al.
4,196,561 A 4/1980 Kruse
4,557,019 A 12/1985 Van Devanter et al.
4,651,384 A 3/1987 Korhonen
4,815,919 A 3/1989 Juravic
4,962,568 A 10/1990 Rudy et al.
4,967,652 A 11/1990 Mally
5,048,719 A 9/1991 Empl et al.
5,054,345 A 10/1991 Weber
5,056,648 A 10/1991 Huber et al.
5,064,667 A 11/1991 Mally
5,117,717 A 6/1992 Mally
5,146,827 A * 9/1992 Komatsu .................. B26D 5/06 83/482
5,152,208 A 10/1992 Ruetschle et al.
5,186,090 A 2/1993 Bunch, Jr.
5,201,259 A 4/1993 Covert et al.
5,241,887 A * 9/1993 Wolff ....................... B26D 1/20 83/248
5,249,491 A 10/1993 Carter
5,267,168 A 11/1993 Antonissen et al.
5,271,304 A 12/1993 Wygal et al.
5,314,375 A 5/1994 O'Brien et al.
5,324,228 A 6/1994 Vogeley, Jr.
5,334,084 A 8/1994 O'Brien et al.
5,343,791 A 9/1994 Julian et al.
5,410,954 A 5/1995 Wygal et al.
5,423,250 A 6/1995 Anderson et al.
5,423,657 A 6/1995 Frost et al.
5,429,548 A 7/1995 Long et al.
5,431,935 A 7/1995 Carey
5,470,274 A 11/1995 Kadi et al.
5,481,466 A 1/1996 Carey
5,482,166 A 1/1996 Brown
5,580,599 A 12/1996 Fehr
5,668,634 A 9/1997 Newman
5,720,593 A 2/1998 Pleake
5,727,997 A 3/1998 Dufour et al.
5,784,937 A 7/1998 Wygal et al.
5,832,802 A * 11/1998 Warthen ................... D06H 7/00 83/563
5,902,177 A 5/1999 Tessier et al.
5,944,598 A 8/1999 Tong et al.
5,974,925 A 11/1999 Lindee et al.
6,123,004 A 9/2000 Matz
6,129,625 A 10/2000 Cate et al.
6,186,059 B1 2/2001 Mello et al.
6,189,059 B1 2/2001 Sotek et al.
6,198,834 B1 3/2001 Belk et al.
6,253,651 B1 * 7/2001 Bessemer ................ B26D 1/29 83/171
6,407,818 B1 6/2002 Whitehouse
6,511,370 B1 1/2003 Mello et al.
6,601,499 B1 8/2003 Bifulco
6,604,991 B1 8/2003 Jurs et al.
6,606,927 B1 * 8/2003 Lisec .................... C03B 33/078 83/13
6,692,345 B1 2/2004 Kruger
6,837,030 B2 1/2005 Drebing et al.
6,859,282 B1 2/2005 Weber et al.
6,860,804 B2 3/2005 Kruger
6,882,434 B1 4/2005 Sandberg et al.
6,931,973 B2 8/2005 Kuchler
6,997,089 B2 2/2006 Lindee et al.
7,052,388 B2 5/2006 Houtz
7,055,419 B2 6/2006 Sandberg
7,156,730 B1 1/2007 Blaine
7,251,537 B1 7/2007 Blaine et al.
7,364,504 B2 4/2008 Gasbarro
7,373,217 B2 5/2008 Young
7,399,220 B2 7/2008 Kriesel et al.
7,404,759 B2 7/2008 Sato
7,450,247 B2 11/2008 Sandberg et al.
7,452,266 B2 11/2008 Bottemiller
7,500,550 B2 3/2009 Strong et al.
7,621,806 B2 11/2009 Bottemiller et al.
7,623,249 B2 11/2009 Sandberg et al.
7,651,388 B2 1/2010 Faires et al.
7,684,030 B2 3/2010 Berube et al.
7,698,977 B2 4/2010 Culling
7,715,935 B2 5/2010 Vogeley et al.
7,747,042 B2 6/2010 Blaine
7,841,264 B2 11/2010 Kim et al.
7,918,718 B2 4/2011 Christensen et al.
7,949,414 B2 5/2011 Blaine et al.
8,016,649 B2 9/2011 Schimitzek
8,025,000 B2 9/2011 Kim et al.
8,096,860 B2 1/2012 Bolte et al.
8,109,065 B2 2/2012 Drebing et al.
8,116,554 B2 2/2012 Burton
8,166,856 B2 5/2012 Kim et al.
8,373,749 B2 2/2013 Burton
8,404,069 B2 3/2013 Douglas
8,495,938 B2 7/2013 Weber
8,517,806 B2 8/2013 Fillenworth et al.
8,529,321 B2 9/2013 Weber
8,643,851 B2 2/2014 Weber
8,651,000 B2 2/2014 Weber
8,679,565 B2 3/2014 Finkowski
8,683,903 B2 4/2014 Strong et al.
8,688,267 B2 4/2014 Blaine et al.
8,721,405 B2 5/2014 McKenna et al.
8,740,541 B2 6/2014 Pryor et al.
8,755,051 B2 6/2014 Thiedig
8,758,099 B2 6/2014 Reifenhaeuser
8,862,262 B2 10/2014 Thorsson et al.
8,869,664 B2 10/2014 Eyles et al.
8,892,239 B2 11/2014 Weber

(56) References Cited

U.S. PATENT DOCUMENTS

| | | | | |
|---|---|---|---|---|
| 8,893,599 | B2 | 11/2014 | Reifenhaeuser | |
| 8,968,808 | B1 | 3/2015 | Kunert et al. | |
| 8,986,080 | B2 | 3/2015 | Black et al. | |
| 8,997,969 | B2 | 4/2015 | Plakolm | |
| 9,061,432 | B2 | 6/2015 | Reifenhaeuser | |
| 9,091,673 | B2 | 7/2015 | Fern et al. | |
| 9,095,147 | B2 | 8/2015 | Hjalmarsson et al. | |
| 9,198,442 | B2 | 12/2015 | Peters et al. | |
| 9,247,755 | B1 | 2/2016 | Andre et al. | |
| 9,272,428 | B2 | 3/2016 | Mueller et al. | |
| 9,285,213 | B2 | 3/2016 | Lindee et al. | |
| 9,351,498 | B2 | 5/2016 | Grimm et al. | |
| 9,386,780 | B2 | 7/2016 | Soncini | |
| 9,424,061 | B2 | 8/2016 | Freimuth et al. | |
| 9,427,014 | B2 | 8/2016 | Graham et al. | |
| 9,526,257 | B1 | 12/2016 | Farrant et al. | |
| 9,538,768 | B2 | 1/2017 | Dunivan | |
| 9,561,913 | B2 | 2/2017 | Briel et al. | |
| 9,597,812 | B2 | 3/2017 | Schmeiser | |
| 9,700,060 | B2 | 7/2017 | Inoue et al. | |
| 9,737,942 | B2 | 8/2017 | Nispel | |
| 9,770,838 | B2 | 9/2017 | Kim et al. | |
| 9,778,651 | B2 | 10/2017 | Strong et al. | |
| 9,828,185 | B1 | 11/2017 | Talken et al. | |
| 9,888,696 | B2 | 2/2018 | Lindee et al. | |
| 9,913,483 | B2 | 3/2018 | Vuholm et al. | |
| 9,927,377 | B2 | 3/2018 | Mills | |
| 9,962,782 | B2 | 5/2018 | Nispel | |
| 9,999,985 | B2 | 6/2018 | Middleton et al. | |
| 10,040,213 | B2 | 8/2018 | Nielsen | |
| 10,065,335 | B2 | 9/2018 | Mayer et al. | |
| 10,245,742 | B2 | 4/2019 | Foreman et al. | |
| 10,245,745 | B2 | 4/2019 | Volkl et al. | |
| 10,315,326 | B2 | 6/2019 | Achenbach et al. | |
| 10,492,504 | B2 | 12/2019 | Volkl et al. | |
| 10,493,648 | B2 * | 12/2019 | Nakatsu | B26D 1/205 |
| 10,510,204 | B2 | 12/2019 | Castellano | |
| 10,538,009 | B2 | 1/2020 | Schmeiser et al. | |
| 10,654,185 | B2 | 5/2020 | Blaine et al. | |
| 10,661,466 | B2 | 5/2020 | Mayer et al. | |
| 10,682,781 | B2 | 6/2020 | Perini | |
| 10,695,931 | B2 | 6/2020 | Perini | |
| 10,695,932 | B2 | 6/2020 | Burk et al. | |
| 10,710,259 | B2 | 7/2020 | Völkl et al. | |
| 10,759,071 | B2 | 9/2020 | Chan | |
| 10,836,063 | B2 | 11/2020 | Mayer et al. | |
| 10,843,362 | B2 | 11/2020 | Grasselli | |
| 10,843,364 | B2 | 11/2020 | Volkl et al. | |
| 10,850,416 | B2 | 12/2020 | Schmeiser et al. | |
| 10,863,751 | B2 | 12/2020 | Blaine | |
| 10,869,489 | B2 | 12/2020 | Blaine et al. | |
| 10,875,207 | B2 | 12/2020 | Volkl et al. | |
| 11,009,472 | B2 | 5/2021 | Von Keudell et al. | |
| 11,014,257 | B2 | 5/2021 | Sunter et al. | |
| 11,202,452 | B2 | 12/2021 | Hofmann et al. | |
| 11,540,524 | B2 | 1/2023 | Lanzky et al. | |
| 12,227,367 | B2 | 2/2025 | Seager et al. | |
| 2001/0036807 | A1 | 11/2001 | Veldkamp et al. | |
| 2002/0004366 | A1 | 1/2002 | Thorvaldsson et al. | |
| 2003/0008608 | A1 | 1/2003 | Scalia et al. | |
| 2004/0029514 | A1 | 2/2004 | Kruger | |
| 2004/0108645 | A1 | 6/2004 | Lindelof et al. | |
| 2004/0194605 | A1 | 10/2004 | Weber | |
| 2004/0200365 | A1 | 10/2004 | Young | |
| 2004/0231526 | A1 | 11/2004 | Childress et al. | |
| 2005/0032471 | A1 | 2/2005 | Pfarr et al. | |
| 2005/0085176 | A1 | 4/2005 | Houtz | |
| 2005/0120844 | A1 | 6/2005 | Weber | |
| 2005/0188657 | A1 | 9/2005 | Drebing et al. | |
| 2005/0199111 | A1 | 9/2005 | Sandberg et al. | |
| 2006/0154587 | A1 | 7/2006 | Mikkelsen et al. | |
| 2006/0156878 | A1 | 7/2006 | Faires et al. | |
| 2006/0162515 | A1 | 7/2006 | Vogeley et al. | |
| 2006/0171581 | A1 | 8/2006 | Blaine | |
| 2006/0205335 | A1 | 9/2006 | Bifulco | |
| 2006/0219069 | A1 | 10/2006 | Skaar et al. | |
| 2007/0028742 | A1 | 2/2007 | Mueller et al. | |
| 2007/0193425 | A1 | 8/2007 | Weber | |
| 2007/0202229 | A1 | 8/2007 | Nielsen | |
| 2007/0264397 | A1 | 11/2007 | Mather et al. | |
| 2008/0016999 | A1 | 1/2008 | Mathues et al. | |
| 2008/0200107 | A1 | 8/2008 | Christensen et al. | |
| 2008/0212842 | A1 | 9/2008 | Burton | |
| 2008/0281461 | A1 | 11/2008 | Blaine et al. | |
| 2009/0035434 | A1 | 2/2009 | Sverrisson et al. | |
| 2009/0038455 | A1 | 2/2009 | Strong et al. | |
| 2009/0064833 | A1 | 3/2009 | Sandberg et al. | |
| 2009/0120256 | A1 | 5/2009 | Pasek | |
| 2009/0137195 | A1 | 5/2009 | Bottemiller et al. | |
| 2009/0246333 | A1 | 10/2009 | Groneberg et al. | |
| 2009/0294246 | A1 | 12/2009 | Pogue | |
| 2010/0066824 | A1 | 3/2010 | Burton | |
| 2010/0116107 | A1 | 5/2010 | Spillner et al. | |
| 2010/0170373 | A1 | 7/2010 | Green | |
| 2010/0179684 | A1 | 7/2010 | Blaine et al. | |
| 2010/0267320 | A1 | 10/2010 | Weber | |
| 2010/0304652 | A1 | 12/2010 | Bolte et al. | |
| 2010/0307303 | A1 | 12/2010 | Weber | |
| 2011/0111682 | A1 | 5/2011 | Schimitzek | |
| 2011/0126679 | A1 | 6/2011 | Weber | |
| 2011/0126680 | A1 | 6/2011 | Weber | |
| 2011/0150604 | A1 | 6/2011 | Marsh et al. | |
| 2011/0154969 | A1 | 6/2011 | Weber | |
| 2011/0179922 | A1 | 7/2011 | Weber | |
| 2011/0185865 | A1 * | 8/2011 | Weber | B26D 7/2635 83/13 |
| 2011/0203434 | A1 | 8/2011 | Reifenhaeuser | |
| 2011/0247466 | A1 | 10/2011 | Weber | |
| 2011/0247470 | A1 | 10/2011 | Weber | |
| 2011/0265621 | A1 | 11/2011 | Schmidt | |
| 2011/0311700 | A1 | 12/2011 | Shah et al. | |
| 2012/0018353 | A1 | 1/2012 | McKenna et al. | |
| 2012/0040597 | A1 | 2/2012 | Fern et al. | |
| 2012/0060659 | A1 | 3/2012 | Weber | |
| 2012/0073415 | A1 | 3/2012 | Maidel et al. | |
| 2012/0115406 | A1 | 5/2012 | Fillenworth et al. | |
| 2012/0137844 | A1 | 6/2012 | Weber | |
| 2012/0137845 | A1 | 6/2012 | Weber | |
| 2012/0198974 | A1 | 8/2012 | Weber | |
| 2012/0198975 | A1 | 8/2012 | Lindee | |
| 2012/0212603 | A1 | 8/2012 | Lindee et al. | |
| 2013/0068076 | A1 | 3/2013 | Schmeiser et al. | |
| 2013/0074667 | A1 | 3/2013 | Weber et al. | |
| 2013/0133490 | A1 | 5/2013 | Schmeiser et al. | |
| 2013/0260660 | A1 | 10/2013 | Reifenhaeuser | |
| 2014/0174891 | A1 | 6/2014 | Mayer | |
| 2014/0338509 | A1 | 11/2014 | Lindee et al. | |
| 2015/0093488 | A1 | 4/2015 | Gutmann et al. | |
| 2015/0122100 | A1 | 5/2015 | Schmeiser | |
| 2015/0150272 | A1 | 6/2015 | Peters et al. | |
| 2015/0190939 | A1 | 7/2015 | Gerlach et al. | |
| 2015/0205288 | A1 | 7/2015 | Strong et al. | |
| 2015/0216192 | A1 | 8/2015 | Jacobsen et al. | |
| 2015/0290827 | A1 | 10/2015 | Evans et al. | |
| 2015/0367523 | A1 | 12/2015 | Schmeiser et al. | |
| 2016/0031110 | A1 | 2/2016 | Middleton et al. | |
| 2016/0088852 | A1 | 3/2016 | Lindee et al. | |
| 2016/0207152 | A1 | 7/2016 | Weber | |
| 2017/0035066 | A1 | 2/2017 | Hukelmann | |
| 2017/0156354 | A1 | 6/2017 | Inoue et al. | |
| 2017/0196232 | A1 | 7/2017 | Vuholm et al. | |
| 2017/0210023 | A1 | 7/2017 | Hocker et al. | |
| 2017/0210569 | A1 | 7/2017 | Dopp et al. | |
| 2017/0212506 | A1 | 7/2017 | Pfarr et al. | |
| 2017/0217044 | A1 | 8/2017 | Blaine | |
| 2017/0245509 | A1 | 8/2017 | Petersen et al. | |
| 2017/0320225 | A1 | 11/2017 | Fox et al. | |
| 2017/0368707 | A1 | 12/2017 | Keller | |
| 2018/0027848 | A1 | 2/2018 | Blaine et al. | |
| 2018/0029246 | A1 | 2/2018 | Blaine et al. | |
| 2018/0158537 | A1 | 6/2018 | Blaine | |
| 2018/0207896 | A1 | 7/2018 | Olson et al. | |
| 2019/0009421 | A1 | 1/2019 | Grasselli | |
| 2019/0152084 | A1 | 5/2019 | Schmeiser | |

(56) References Cited

U.S. PATENT DOCUMENTS

| | | | | |
|---|---|---|---|---|
| 2020/0068908 | A1 | 3/2020 | Blaine | |
| 2020/0068909 | A1 | 3/2020 | Blaine et al. | |
| 2020/0108520 | A1 | 4/2020 | Pryor et al. | |
| 2020/0238556 | A1 | 7/2020 | Blaine et al. | |
| 2020/0269459 | A1* | 8/2020 | Fox | B26D 7/0625 |
| 2020/0315191 | A1 | 10/2020 | Hofmann et al. | |
| 2020/0338777 | A1 | 10/2020 | Beliveau et al. | |
| 2021/0001507 | A1 | 1/2021 | Zambarda | |
| 2021/0092968 | A1 | 4/2021 | Blaine | |
| 2021/0227840 | A1 | 7/2021 | Blaine | |
| 2023/0129471 | A1 | 4/2023 | Torrenga et al. | |
| 2023/0211517 | A1 | 7/2023 | Su et al. | |
| 2024/0058981 | A1 | 2/2024 | Stachel | |
| 2024/0399602 | A1 | 12/2024 | Kamsteeg et al. | |

FOREIGN PATENT DOCUMENTS

| | | | | |
|---|---|---|---|---|
| AU | 2013301673 | B2 | 12/2016 | |
| AU | 2012267912 | B2 | 12/2019 | |
| CA | 2039045 | A1 | 9/1991 | |
| CA | 2006994 | C | 9/1992 | |
| CA | 2133953 | A1 | 11/1993 | |
| CA | 1328856 | C | 4/1994 | |
| CA | 2158625 | A1 | 3/1996 | |
| CA | 2377198 | A1 | 9/2002 | |
| CA | 2200545 | C | 1/2003 | |
| CA | 2525674 | A1 | 12/2004 | |
| CA | 2531621 | A1 | 6/2006 | |
| CA | 2531626 | A1 | 6/2006 | |
| CA | 2531857 | A1 | 6/2006 | |
| CA | 2541555 | A1 | 10/2006 | |
| CA | 2550972 | A1 | 12/2006 | |
| CA | 2664348 | A1 | 5/2008 | |
| CA | 2511654 | C | 6/2009 | |
| CA | 2708216 | A1 | 6/2009 | |
| CA | 2767423 | A1 | 1/2011 | |
| CA | 2779326 | A1 | 5/2011 | |
| CA | 3013395 | A1 | 5/2011 | |
| CA | 2783818 | A1 | 6/2011 | |
| CA | 2738300 | A1 | 10/2011 | |
| CA | 2552307 | C | 1/2012 | |
| CA | 2531852 | C | 2/2013 | |
| CA | 2531863 | C | 2/2013 | |
| CA | 2743418 | C | 4/2013 | |
| CA | 2531895 | C | 8/2013 | |
| CA | 2695808 | C | 11/2015 | |
| CA | 2877448 | C | 10/2016 | |
| CA | 2904958 | A1 | 3/2017 | |
| CA | 2706407 | C | 5/2017 | |
| CA | 3032041 | A1 | 2/2018 | |
| CA | 2899291 | C | 3/2018 | |
| CA | 2778724 | C | 9/2018 | |
| CA | 3108061 | A1 | 3/2020 | |
| CA | 3032196 | C | 10/2020 | |
| CA | 3137380 | A1 | 11/2020 | |
| CN | 105979784 | A | 9/2016 | |
| DE | 2843388 | A1 | 6/1979 | |
| DE | 8128596 | U1 | 3/1982 | |
| DE | 3100901 | A1 | 8/1982 | |
| DE | 3544708 | A1 | 6/1987 | |
| DE | 68903375 | T2 | 3/1993 | |
| DE | 19917536 | A1 * | 10/2000 | B26D 5/02 |
| DE | 10220006 | A1 | 11/2003 | |
| DE | 102004010696 | A1 | 9/2005 | |
| DE | 60305523 | T2 | 8/2007 | |
| DE | 102010011172 | A1 * | 9/2011 | B26D 1/157 |
| DE | 102010021951 | A1 | 12/2011 | |
| DE | 102012107278 | A1 | 2/2014 | |
| DE | 102016003938 | A1 * | 10/2017 | B26D 1/16 |
| DE | 102019110313 | B3 | 7/2020 | |
| DK | 201570224 | A1 | 4/2015 | |
| EP | 0101264 | A2 | 2/1984 | |
| EP | 0057478 | B1 | 4/1986 | |
| EP | 0332895 | A2 | 9/1989 | |
| EP | 341564 | A1 | 11/1989 | |
| EP | 0373844 | A1 | 6/1990 | |
| EP | 0449512 | A1 | 10/1991 | |
| EP | 0637278 | A1 | 2/1995 | |
| EP | 587870 | B1 | 2/1996 | |
| EP | 0377451 | B1 | 4/1997 | |
| EP | 690773 | B1 | 2/1998 | |
| EP | 1064518 | A2 | 1/2001 | |
| EP | 1174034 | A1 | 1/2002 | |
| EP | 1243386 | A2 | 9/2002 | |
| EP | 0971595 | B1 | 2/2003 | |
| EP | 1211944 | B1 | 9/2004 | |
| EP | 1429898 | B1 | 5/2005 | |
| EP | 1356906 | B1 | 8/2005 | |
| EP | 1626622 | A2 | 2/2006 | |
| EP | 1555882 | B1 | 5/2006 | |
| EP | 1289374 | B1 | 7/2007 | |
| EP | 2084968 | A1 | 8/2009 | |
| EP | 2094102 | A1 | 9/2009 | |
| EP | 1781110 | B1 | 2/2010 | |
| EP | 2210495 | A1 | 7/2010 | |
| EP | 2230920 | A2 | 9/2010 | |
| EP | 2266766 | A2 | 12/2010 | |
| EP | 1178878 | B2 | 5/2011 | |
| EP | 2352381 | A2 | 8/2011 | |
| EP | 2353391 | A1 | 8/2011 | |
| EP | 1583640 | B1 | 10/2011 | |
| EP | 1820614 | B1 | 10/2011 | |
| EP | 2258523 | B1 | 11/2011 | |
| EP | 1552912 | B1 | 2/2012 | |
| EP | 2190637 | B1 | 2/2012 | |
| EP | 2272640 | B1 | 2/2012 | |
| EP | 2452168 | A1 | 5/2012 | |
| EP | 2509454 | A2 | 10/2012 | |
| EP | 2450166 | B1 | 11/2012 | |
| EP | 2572840 | A2 | 3/2013 | |
| EP | 2572841 | A2 | 3/2013 | |
| EP | 2572842 | A2 | 3/2013 | |
| EP | 2625959 | A2 | 8/2013 | |
| EP | 2516118 | B1 | 11/2013 | |
| EP | 2664425 | A2 | 11/2013 | |
| EP | 2531038 | B1 | 12/2013 | |
| EP | 2644337 | B1 | 3/2014 | |
| EP | 1915240 | B1 | 4/2014 | |
| EP | 2029330 | B1 | 4/2014 | |
| EP | 2755018 | A1 | 7/2014 | |
| EP | 2618962 | B1 | 8/2014 | |
| EP | 2493765 | B1 | 10/2014 | |
| EP | 2809454 | A1 | 12/2014 | |
| EP | 2435220 | B1 | 7/2015 | |
| EP | 2537651 | B1 | 10/2015 | |
| EP | 2829372 | B1 | 12/2015 | |
| EP | 2341313 | B1 | 3/2016 | |
| EP | 2796255 | B1 | 5/2016 | |
| EP | 2835236 | B1 | 6/2016 | |
| EP | 3069836 | A1 | 9/2016 | |
| EP | 2359992 | B2 | 12/2016 | |
| EP | 2444213 | B1 | 1/2017 | |
| EP | 1534478 | B1 | 3/2017 | |
| EP | 2437920 | B1 | 5/2017 | |
| EP | 3170632 | A1 | 5/2017 | |
| EP | 3069835 | B1 | 11/2017 | |
| EP | 2315650 | B1 | 12/2017 | |
| EP | 3275313 | A1 | 1/2018 | |
| EP | 2439029 | B1 | 4/2018 | |
| EP | 2882296 | B1 | 4/2018 | |
| EP | 2885115 | B1 | 4/2018 | |
| EP | 3160241 | B1 | 10/2018 | |
| EP | 3386691 | A1 | 10/2018 | |
| EP | 2494307 | B1 | 12/2018 | |
| EP | 3483553 | A1 | 5/2019 | |
| EP | 3305696 | B1 | 7/2019 | |
| EP | 3224005 | B1 | 8/2019 | |
| EP | 3238898 | B1 | 10/2019 | |
| EP | 2414140 | B1 | 11/2019 | |
| EP | 1782929 | B2 | 12/2019 | |
| EP | 3578917 | A1 | 12/2019 | |
| EP | 3332928 | B1 | 1/2020 | |
| EP | 3424332 | B1 | 1/2020 | |
| EP | 3392847 | B1 | 2/2020 | |

(56) References Cited

FOREIGN PATENT DOCUMENTS

| | | | |
|---|---|---|---|
| EP | 3689563 | A1 | 8/2020 |
| EP | 3448643 | B1 | 9/2020 |
| EP | 3448642 | B1 | 10/2020 |
| EP | 2895308 | B1 | 1/2021 |
| EP | 3760368 | A1 | 1/2021 |
| EP | 3490383 | B1 | 5/2021 |
| EP | 3174666 | B1 | 7/2021 |
| EP | 3843549 | A1 | 7/2021 |
| EP | 3386692 | B1 | 9/2021 |
| EP | 3888864 | A1 | 10/2021 |
| EP | 3900899 | A1 | 10/2021 |
| EP | 2844440 | B2 | 11/2021 |
| EP | 3448641 | B1 | 9/2022 |
| FR | 2737479 | A1 | 2/1997 |
| GB | 483604 | A | 4/1938 |
| GB | 2075459 | B | 6/1984 |
| GB | 2377362 | A | 1/2003 |
| GB | 2364894 | B | 11/2004 |
| JP | 2007522948 | A | 8/2007 |
| JP | 5025271 | B2 | 9/2012 |
| KR | 20100101880 | A | 9/2010 |
| KR | 101025501 | B1 | 4/2011 |
| KR | 20190005814 | A | 1/2019 |
| KR | 102018637 | B1 | 9/2019 |
| MX | 2017003541 | A | 10/2017 |
| WO | WO9322114 | A1 | 11/1993 |
| WO | WO9947885 | A2 | 9/1999 |
| WO | WO200062983 | A1 | 10/2000 |
| WO | WO0132369 | A1 | 5/2001 |
| WO | WO200328963 | A1 | 4/2003 |
| WO | WO200359585 | A2 | 7/2003 |
| WO | WO2004105519 | A2 | 12/2004 |
| WO | WO2004106020 | A1 | 12/2004 |
| WO | WO2006080033 | A1 | 8/2006 |
| WO | WO2006136814 | A1 | 12/2006 |
| WO | WO2007022782 | A2 | 3/2007 |
| WO | WO2007096363 | A1 | 8/2007 |
| WO | WO2008057732 | A1 | 5/2008 |
| WO | WO2009079173 | A2 | 6/2009 |
| WO | WO2010054332 | A2 | 5/2010 |
| WO | WO2011072187 | A2 | 6/2011 |
| WO | WO2012161577 | A1 | 11/2012 |
| WO | WO2013113518 | A1 | 8/2013 |
| WO | WO2013135264 | A1 | 9/2013 |
| WO | WO2013148322 | A1 | 10/2013 |
| WO | WO2014023626 | A2 | 2/2014 |
| WO | WO201460340 | A1 | 4/2014 |
| WO | WO2015092935 | A1 | 6/2015 |
| WO | WO2015114118 | A1 | 8/2015 |
| WO | WO2015193507 | A1 | 12/2015 |
| WO | WO2016045683 | A1 | 3/2016 |
| WO | WO2017133972 | A1 | 8/2017 |
| WO | WO2017186826 | A1 | 11/2017 |
| WO | WO2018111108 | A2 | 6/2018 |
| WO | WO2020046868 | A1 | 3/2020 |
| WO | WO2020212246 | A1 | 10/2020 |
| WO | WO2020225529 | A1 | 11/2020 |

OTHER PUBLICATIONS

International Search Report and Written Opinion for PCT/US2022/047623 mailed dated Apr. 17, 2023, 58 pages.

* cited by examiner

BLADE ASSEMBLY AND RETRACTION MECHANISM FOR A HIGH-SPEED FOOD SLICING APPARATUS

CROSS-REFERENCE TO RELATED APPLICATION

This application claims the priority of U.S. provisional application Ser. No. 63/271,459, filed on Oct. 25, 2021, the contents of which are incorporated herein in its entirety.

FIELD OF THE INVENTION

The present disclosure generally relates to an apparatus for slicing food products using a rotating blade, such as an involute blade, which is capable of reciprocal movement toward and away from the food product being sliced.

BACKGROUND

The present disclosure generally relates to an apparatus for slicing food products using a rotating blade, such as an involute blade. Food products, often in the form of a food "log" or a bacon belly slab, are fed in a forward direction by a conveyor or tractor system toward a slicing blade. The food product is fed continuously in the forward or downstream direction as the blade rapidly rotates.

In some food slicing systems, a rotating blade slices multiple slices of a food product. There is usually a dwell time or period of time that the food product is not advanced toward the blade for slicing, which may occur between production of separate stacks, portions, or "drafts" of the food slices. This permits the produced food draft to move further along a conveyor belt before production of the next food stack begins.

During the dwell time or non-cutting time, the blade continues to rotate, but does not produce additional slices as the blade is out of contact with the food product. However, because the food product often is soft or has water added, it does not necessarily act as a rigid solid mass, and may bulge slightly or "flow," however minutely, as it rests on the conveyor belt. Such slight bulging or flowing causes the food product to nonetheless contact the spinning blade, which produces a small quantity of food product or "shrapnel" in the form of food particles, unwanted scrap, and other small pieces of food product. This is unhygienic and requires additional cleaning of the machine, and such accumulation of food product tends to unduly clog various mechanical linkages and mechanisms, and also represents a loss of food product and an unnecessary expense.

Some systems have attempted to compensate for shrapnel and scrap production during the dwell time by linearly moving the blade away the food product during the dwell time. Some systems retract the food product away from the blade using a rear gripper. Other systems retract the blade away from the food product in a parallel or linear manner using rails, spindles, or other guide mechanisms. However, such linear mechanisms require a complex structural arrangement and is expensive to manufacture and difficult to maintain.

In certain embodiments of the subject invention, the blade or blade assembly is pivoted or reciprocally displaced by a small amount relative to the face of the food product so that movement of the blade face away from the food product creates a sufficient gap such that the blade is out of contact with the food product.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

SUMMARY

Figure 1:
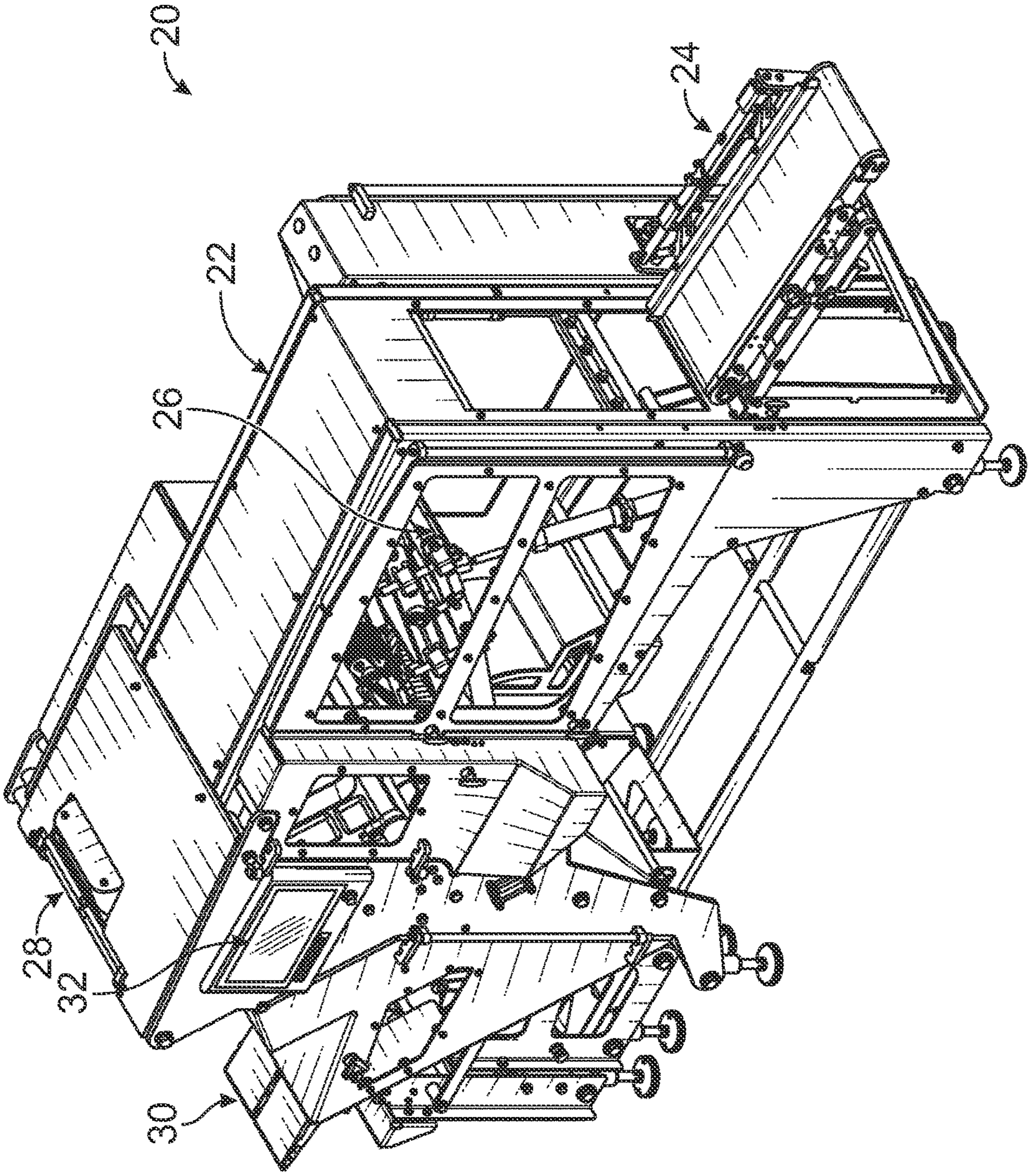
FIG. 1 is a perspective view of a food product slicing machine generally, according to one embodiment.
Figure 2:
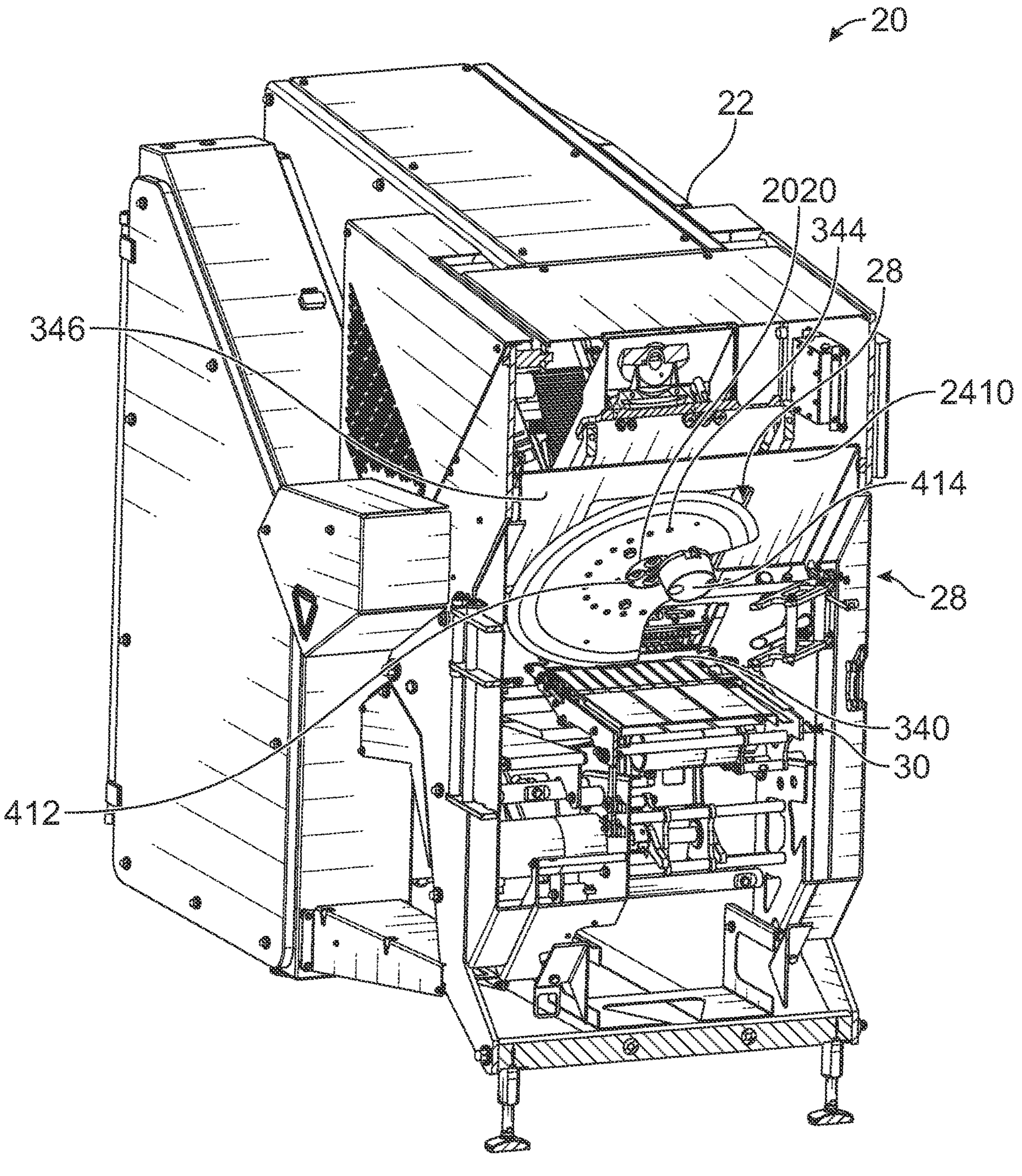
FIG. 2 is a perspective view of the food product slicing machine of FIG. 1, particularly showing the slicing blade and mount, according to one embodiment.

A food slicing system includes a main frame and a blade reciprocating assembly located between an input conveyor and output conveyor. The blade reciprocating assembly further includes a support frame, a rotating cutting blade mounted to the support frame, a motor mounted on the support frame configured to operatively drive the cutting blade, and a support shaft operatively coupled to the main frame at opposite ends thereof. The support shaft is coupled to an upper portion of the support frame and is configured to support the support frame and permit pivotal movement of the support frame about the support shaft and relative to the main frame. A drive shaft is operatively coupled to the main frame and is rotationally driven by an actuator. A plurality of linkage elements are configured to operatively couple the drive shaft to a lower portion of the support frame, where the linkage elements are configured to reciprocally move the blade reciprocating assembly between a slicing position and a clearance position, and where the support frame pivots about the support shaft during the reciprocal movement.

DETAILED DESCRIPTION

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Referring now to FIGS. 1-6, a food product slicing apparatus 20 is used to slice food products into slices. The food products may include a wide variety of edible materials including, but not limited to meat, such as pork bellies, beef, chicken, fish, etc., and cheese.

The food product slicing apparatus 20 includes a main frame 22, a load assembly 24 mounted on the main frame 22, a feed assembly 26 mounted on the main frame 22 downstream of the load assembly 24, a slicing assembly 28 mounted on the main frame 22 downstream of the feed assembly 26, and an output assembly 30 mounted on the main frame 22 downstream of the slicing assembly 28. The food product slicing apparatus 20 further includes a control system 32 configured to control operation of the components of the food product slicing apparatus 20.

The main frame 22 supports the load assembly 24, the feed assembly 26, the slicing assembly 28, and the output assembly 30 on a ground surface, and includes various mechanisms and power systems for powering the food product slicing apparatus 20. The load assembly 24 and the feed assembly 26 are configured to support and handle the food products and to move the food products to the slicing assembly 28. The slicing assembly 28 is configured to slice the food products into individual slices. The sliced food product is supported on the output assembly 30, which may be a conveyor, in stacks or in shingles and is moved away from the slicing assembly 28. The control system 32 includes all the necessary hardware and software to perform all of the operations and functions of the food product slicing apparatus 20. The control system 32 may be mounted on the main frame 22 or may be remote from the main frame 22.

The slicing assembly 28 includes a shear bar 340, a food product gripping assembly (not shown) near the shear bar 340 (FIG. 3) that cooperates with the feed roller 172 (FIG. 3) on the feed assembly 26, a slicing blade 344 for cutting the food products into slices, and a blade retract and driving system or blade reciprocating assembly 346 (FIG. 4) for mounting the slicing blade 344 on the main frame 22 and rotating the slicing blade 344. An upstream side of the blade retract and driving system 346 is best shown in FIG. 4, while the opposite side or downstream side of the blade retract and driving system 346 is best shown in FIG. 3, which also shows a blade counterweight assembly 2410.

Figure 3:
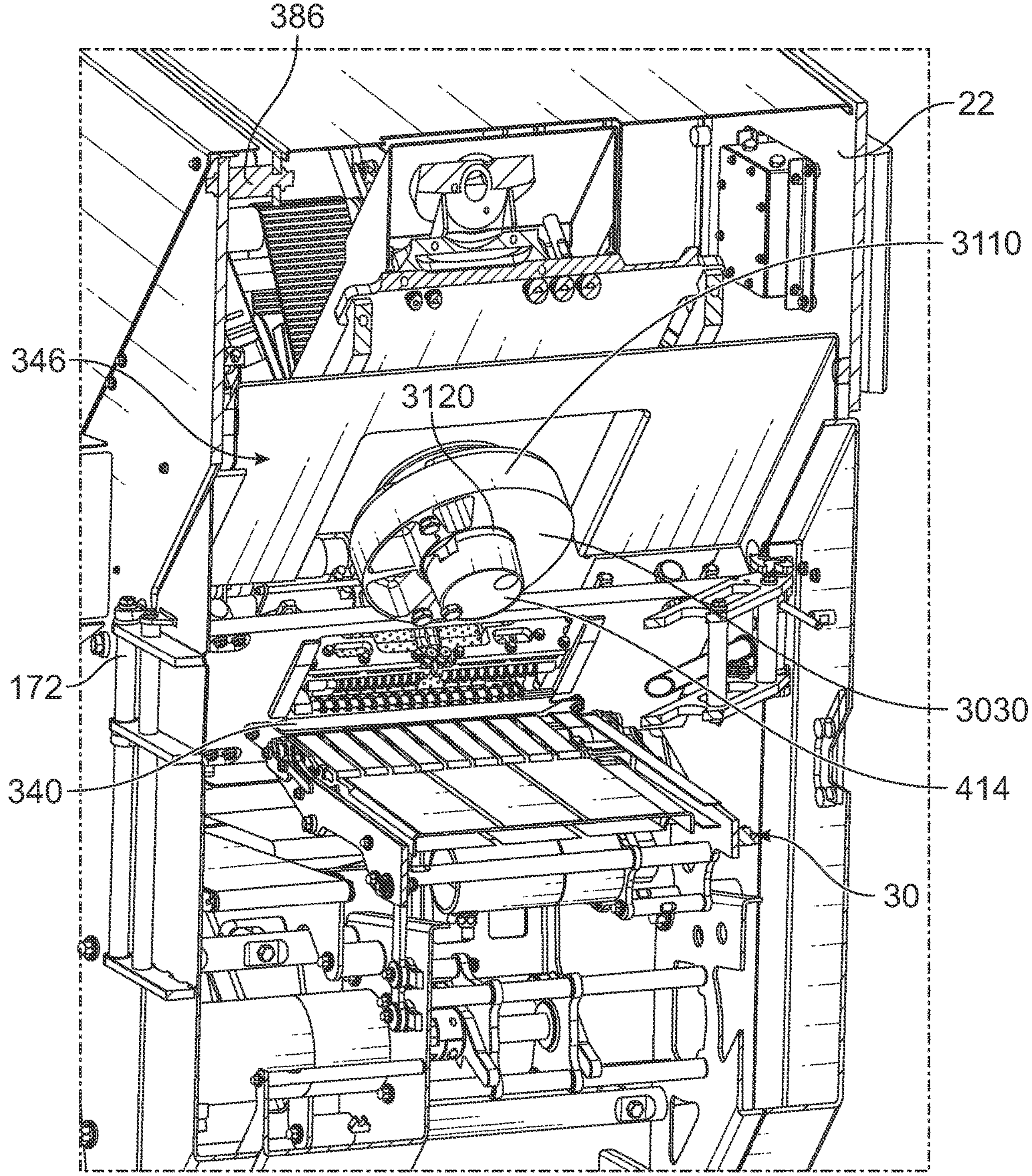
FIG. 3 is a perspective view of the food product slicing machine of FIG. 1, particularly showing the blade mount, according to one embodiment.
Figure 4:
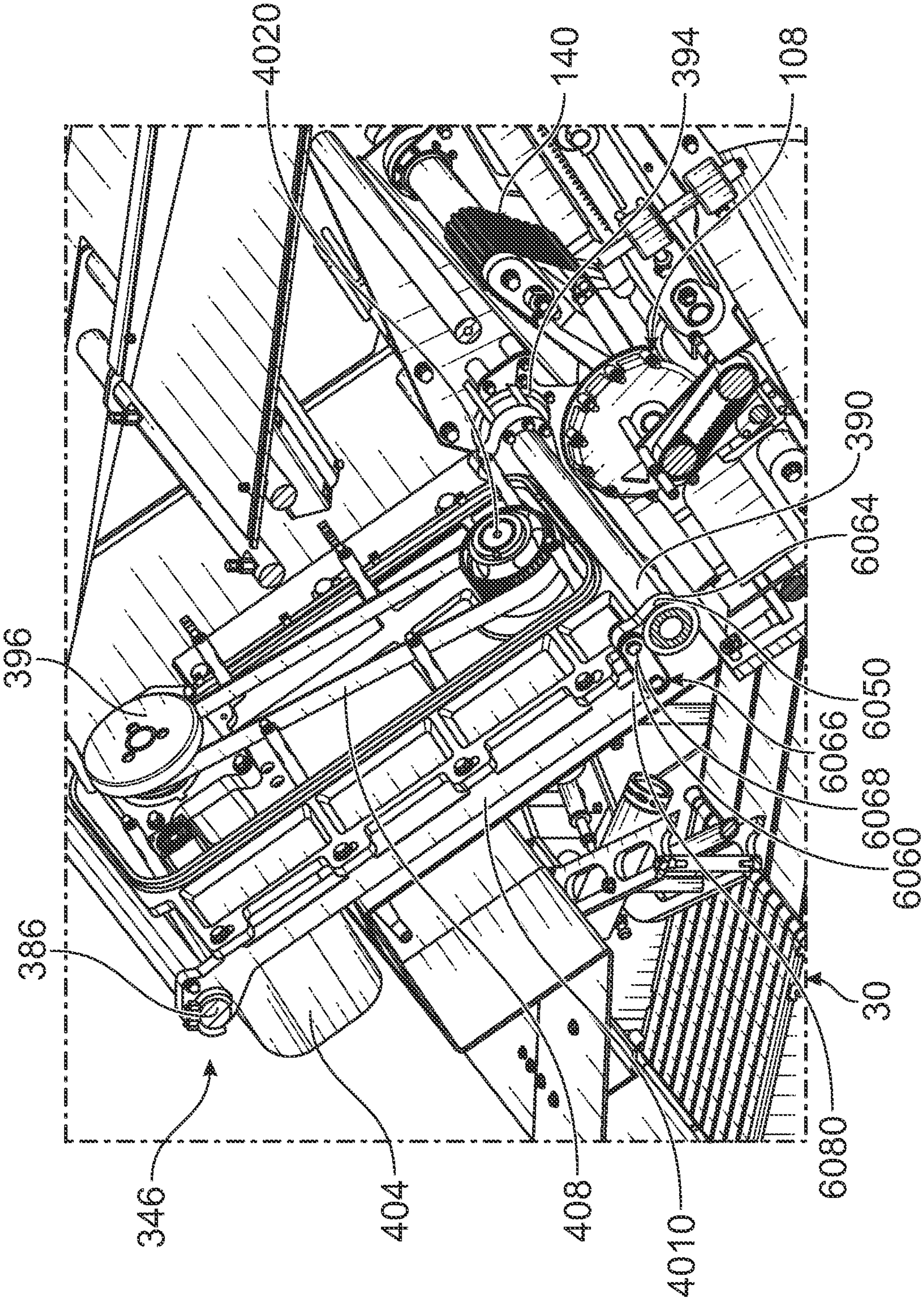
FIG. 4 is a perspective view of the food product slicing machine of FIG. 1, particularly showing a driven or upstream side of the blade assembly, according to one embodiment.
Figure 5:
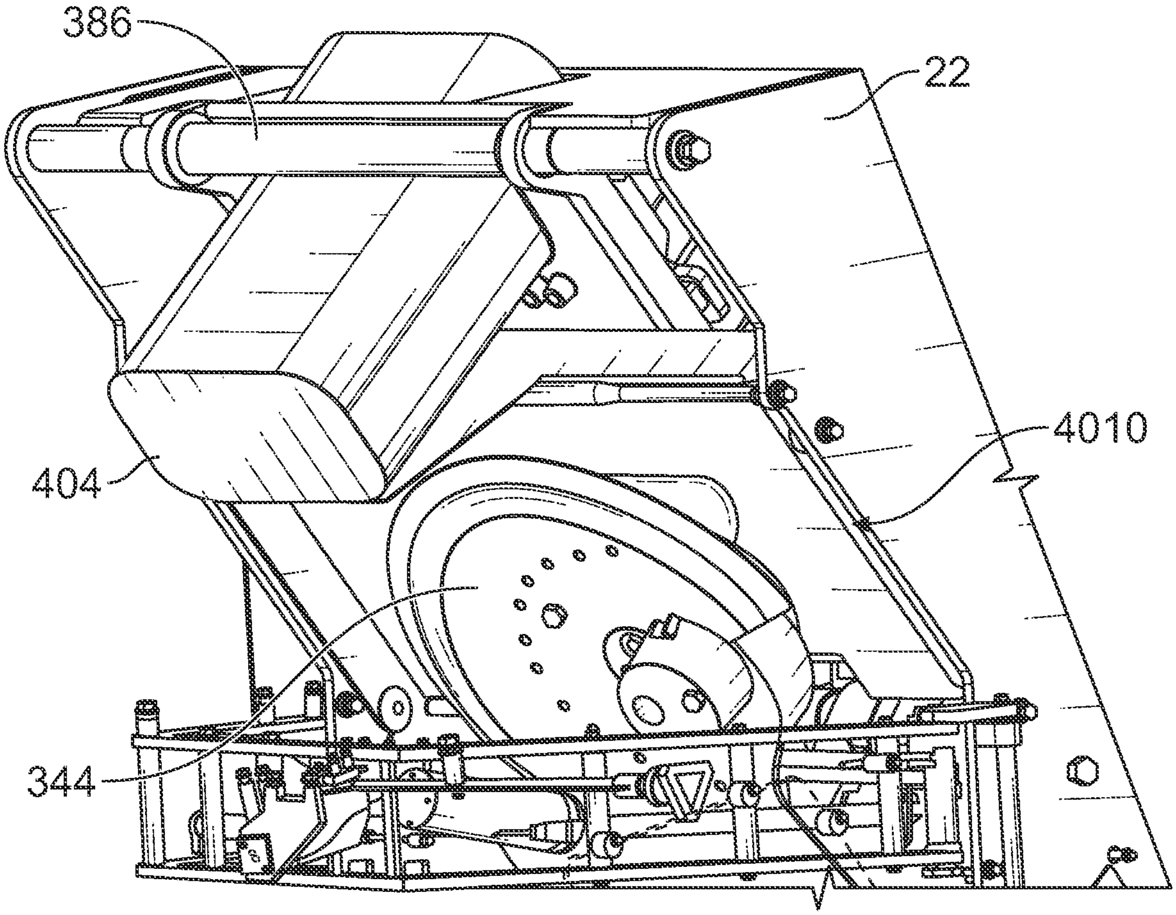
FIG. 5 is a perspective view of the downstream side of the slicing assembly frame of FIG. 4, particularly showing the support shaft and hub components, according to one embodiment.
Figure 6:
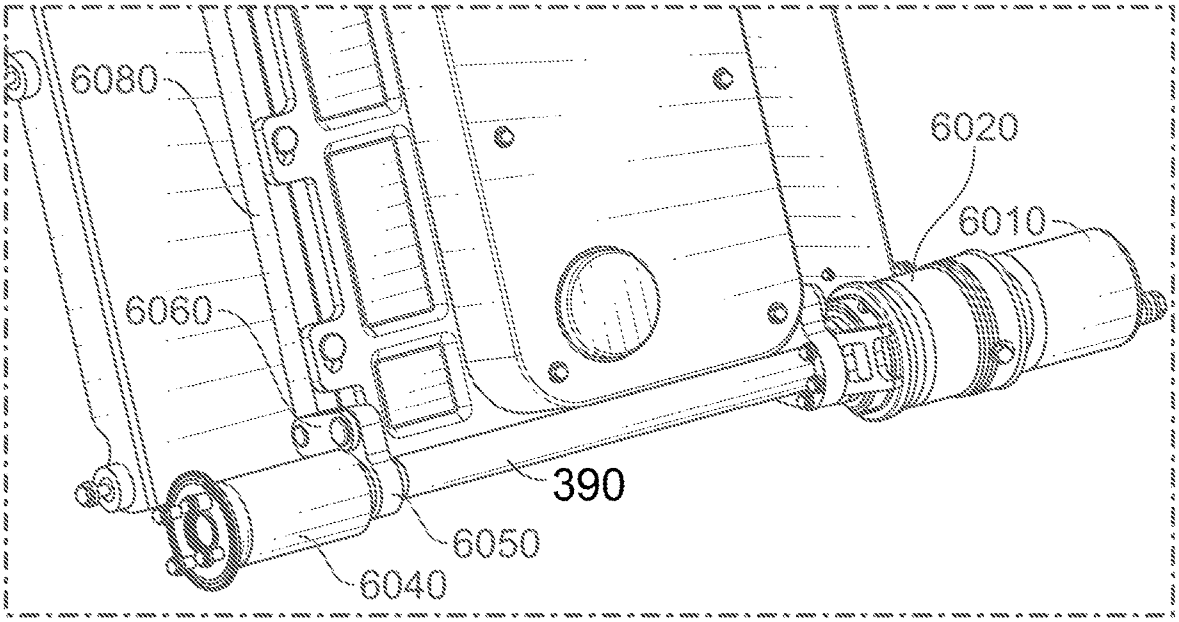
FIG. 6 is a perspective view of the lower driven portion of the slicing assembly frame of FIG. 4, particularly showing the drive shaft, servomotor, and reducer, according to one embodiment.
Figure 7:
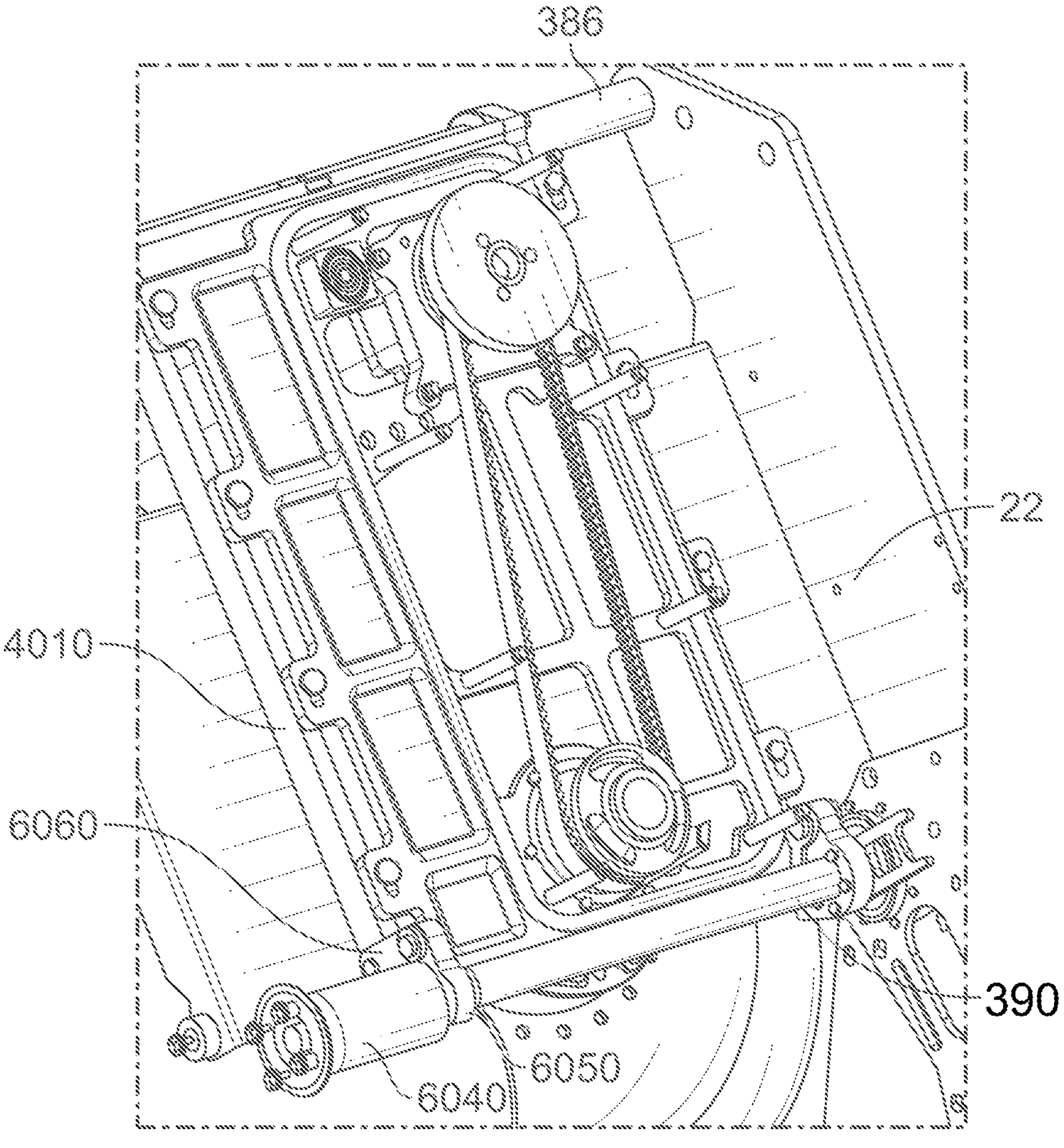
FIG. 7 is a perspective view similar to FIG. 6, according to one embodiment.

Referring now to FIGS. 3-4, the blade retract and driving system 346 reciprocally moves the entire blade mechanism toward and away from the food product as the blade 344 rotates. In the blade counterweight assembly 2410 of FIG. 3, the blade 344, which is preferably an involute blade, may be mounted on a hub 3110. The hub 3110, in turn, is driven by a motor 404 operatively coupled to a slicing assembly frame or support frame 4010. The motor 404 may directly drive a shaft 4020 of the hub 3110, or may indirectly drive the shaft 4020 of the hub by a belt 408 and/or pulley 396 arrangement, according to one embodiment.

The hub 3110 is fixedly secured to a distal end of the drive shaft 4020 and is configured to rotate with the drive shaft 4020. The hub 3110 includes a central pilot projection 3120, which is coaxial with the drive shaft 4020. The pilot projection 3120 may be a separate disk-like component fastened to the hub 3110 with a plurality of bolts 5010, or may be integrally formed with the hub 3110. The pilot projection 3120 may be elevated above the surface of the hub 3110, which hub surface forms a flat, blade contacting surface 3030, that surrounds the pilot projection 3120.

Referring still to FIGS. 3-4, the blade retract and driving system 346 is mounted on the main frame 22 and supports the slicing blade 344 via the slicing assembly frame 4010. The blade retract and driving system 346 assembly may be located between an input conveyor or feed assembly 26 (FIG. 1) and an output conveyor or output assembly 30 (FIG. 1);

The blade retract and driving system 346 along with the slicing assembly frame 4010 may be positioned in an extended, also referred to as the slicing position, in which the slicing blade 344 is parallel to and directly proximate to a downstream surface of the shear bar 340 such that the plane of the cutting blade 344 is substantially co-planar with a cutting plane of the food product. In this slicing position, the cutting blade is configured to slice the food product.

The blade retract and driving system assembly 346 along with the slicing assembly frame 4010 may be reciprocally moved from the slicing position to a clearance position in which the slicing blade 344 is slightly angled away relative to the downstream surface of the shear bar 340. In the clearance position, the plane of the cutting blade is disposed at a predetermined angle away from the cutting plane of the food product, and the cutting blade 344 does not contact the food product. Although the blade may be spinning during this time, also known as a "dwell time," the blade does not contact the food product and no slices are produced during the clearance position.

The slicing assembly frame 4010 supports the hub 3110, the blade 344, and the motor 404, which is configured to operatively drive the hub 3110. An upper support shaft 386 is operatively coupled to an upper portion of the main frame 22 at opposite ends thereof. The upper support shaft 386 is configured to support the slicing assembly frame 4010 and permit pivotal movement of the slicing assembly frame 4010 about the upper support shaft 386 and relative to the main frame 22.

Such pivotal movement of the slicing assembly frame 4010 may be provided by a lower drive shaft 390 operatively coupled to the main frame 22, which lower drive shaft 390 is rotationally driven by an actuator, such as a servomotor 6010. The servomotor is operatively fixed to the main frame 22. A gearbox or reducer 6020 may be operatively coupled between the lower drive shaft 390 and the servomotor 6010. The servomotor 6010 may be a commercially available motor, such as a Beckhoff servomotor model no. AM8851-0dh0-2030. The reducer 6020 may be a commercially available planetary gear reduction gearbox, such as a Wittenstein reducer, model HDP-025S-MA2-22-0G1-1A. In a preferred embodiment, the reducer 6020 may provide a 22:1 reduction in angular rotation from the servomotor 6010 to the lower drive shaft 390.

The reducer 6020 is configured to translate forward rotation and reverse rotation of the servomotor 6010 into corresponding forward rotation and reverse rotation of the lower drive shaft 390, wherein rotation of the lower drive shaft 390, in one embodiment, may be limited to a 15 degree angular displacement in the forward rotational direction and reverse rotational direction. Preferably, the rotational range may be limited to plus and minus 8 degrees in another embodiment.

Referring now to FIGS. 2-7, the servomotor 6010 and reducer 6020, and one end of the lower drive shaft 390 are operatively supported on a portion of the main frame 22, while the other end of the lower drive shaft 390 is supported by drive shaft bearing 6040. The drive shaft bearing 6040 is in turn, supported by a portion of the main frame 22. The upper support shaft 386 and the lower drive shaft 390 each have a longitudinal axis that are parallel to each other and are transverse to the longitudinal axis of the food product slicing apparatus 20. As disclosed above, the slicing assembly frame 4010 pivots about the upper support shaft 386 upon rotation of the lower shaft 390 via linkages, as will be described below.

To provide operative coupling between the lower drive shaft 390 and a lower portion of the slicing assembly frame 4010, a plurality of linkage elements, including a first linkage element 6050 and a second linkage element 6060, are configured to operatively couple the lower drive shaft 390 to a lower portion of the slicing assembly frame 4010. The first linkage element 6050 has first and second ends with the first end 6064 of the first linkage element 6050 fixedly coupled to the lower drive shaft 390. The second linkage element 6060 also has first and second ends, with the first end 6066 of the second linkage element 6060 pivotally coupled to a lower portion 6080 of the slicing assembly frame 4010.

To provide unimpeded pivoting of the slicing assembly frame 4010 about the upper support shaft 386 in a reciprocating manner, the second end of the first linkage element 6050 is pivotally coupled to the second end of the second linkage element 6060 at a common pivot point 6068. The first linkage element 6050 is parallel to the second linkage element 6060 in the axial direction along the length of the drive shaft 390. Thus, when the servomotor 6010 causes rotation of the lower drive shaft 390, the fixedly coupled first linkage element 6050 causes the pivotally coupled second linkage element 6060 to urge the lower portion of the slicing assembly frame 4010 to move either toward or away from the lower drive shaft 390, depending of the direction of rotation. Such movement of the slicing assembly frame 4010 causes pivoting movement of the frame about the upper support shaft 386, thus reciprocally displacing the spinning blade toward or away from the shear bar 340.

Note that in a preferred embodiment, there may be two sets of the plurality of linkage elements 6050 and 6060, one set of linkage elements at a lefthand side of the lower drive shaft 390, and another complementary set of linkage elements at a righthand side of the lower drive shaft 390. Use of two sets of linkage elements prevents undesirable torque of the slicing assembly frame about the upper support shaft 386.

During reciprocating rotation of the lower drive shaft 390, the angle between the first linkage 6050 and the second linkage 6060 about the common pivot point 6068 varies from a maximum angle to a minimum angle. The maximum angle is seen when the blade reciprocating assembly is in the clearance position and the minimum angle is seen when the blade reciprocating assembly is in the cutting position. In the slicing position, the absolute angle between the first linkage 6050 and the second linkage 6060 is about 90 degrees. The difference between the minimum angle and the maximum angle may be in the range of between 4 degrees and 12 degrees. However, such angular displacements may vary depending on the length of the linkage elements and hence the distance that the lower drive shaft 390 is positioned from the lower portion of the slicing assembly frame 4010, as may be required for the particular physical application.

During reciprocating movement of the slicing assembly frame 4010, and as the linkage elements cause the blade to move from the slicing position to the clearance position, the plane or face of the blade may move between 2 degrees to 10 degrees away from the plane of the food product to be cut, e.g. at the shear bar 340. When the slicing assembly frame 4010 and blade are in the slicing position, the plane of the cutting blade is substantially co-planar with the cutting plane of the food product, within a tolerance of between +0.50 degrees and −0.50 degrees.

The frequency and amount at which the slicing assembly frame 4010 is reciprocally moved is dependent on the speed that the food product is fed in the forward and the desired thickness of the slices to be cut.

Figure 8:
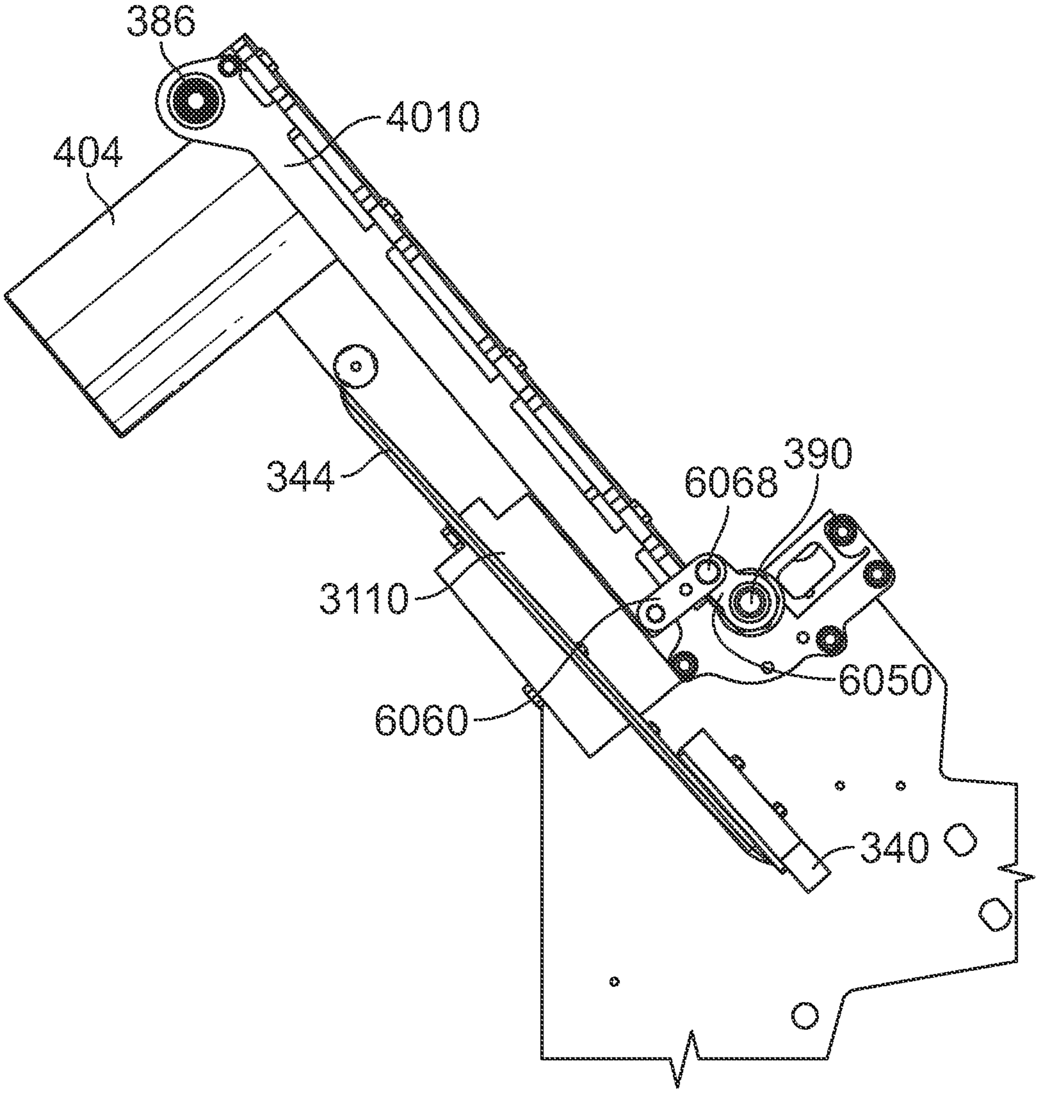
FIG. 8 is a side view of the slicing assembly frame of FIG. 4, particularly showing the linkage elements, according to one embodiment.

As shown in FIG. 8, the slicing assembly frame 4010 is in the slicing position so that the slicing blade 344 slices the food product. In this slicing position, the angle between the first linkage 6050 and the second linkage 6060 is about 90 degrees. However, this angular value may change slightly within a range of about plus three degrees to minus three degrees depending on blade wear, product requirements, and issues of blade flexure, and the like. When the lower drive shaft 390 rotates in the counter-clockwise direction, the first linkage 6050 also rotates in the counter-clockwise direction because it is fixedly coupled to the lower drive shaft 390. This action pushes the first linkage 6050 against the second linkage 6060. Because the second linkage 6060 is pivotally coupled to the lower portion of the slicing assembly frame 4010, the lower portion of the slicing assembly frame 4010 moves outwardly as it pivots about the upper support shaft 386.

Figure 9A:
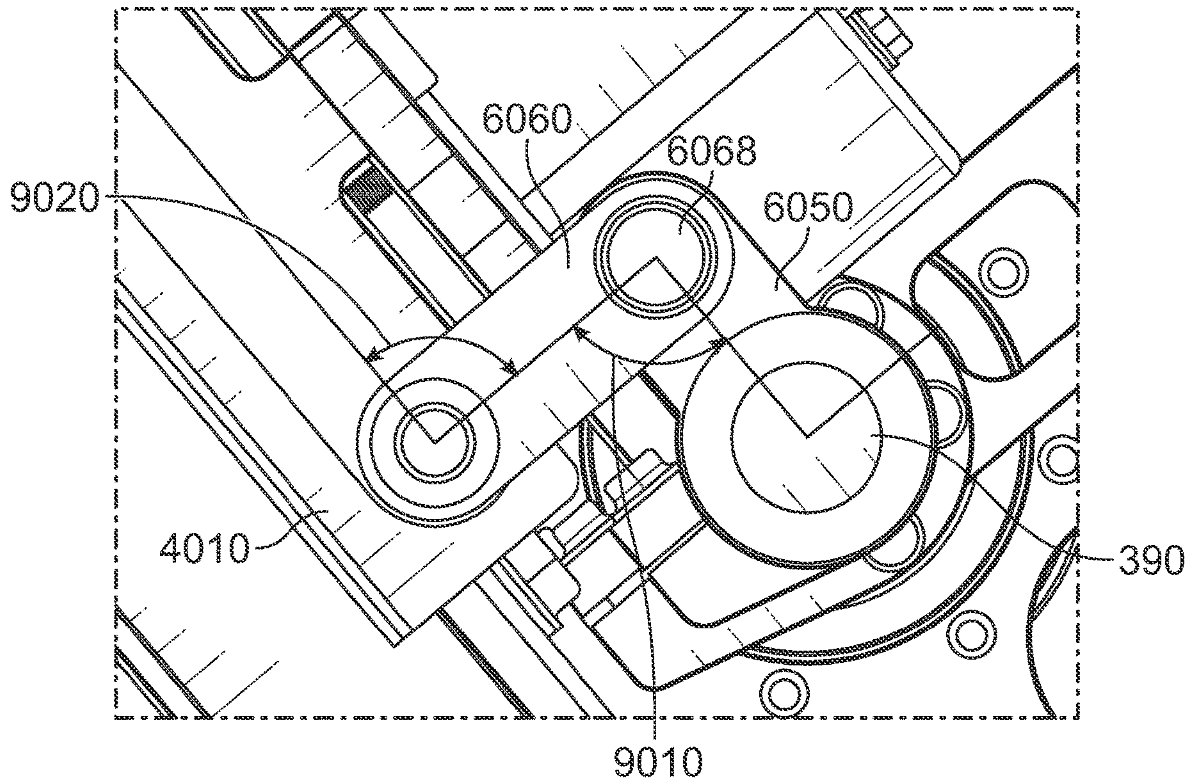
FIGS. 9A and 9A are enlarged side views of the slicing assembly frame of FIG. 4, particularly showing the linkage elements in the slicing position and clearance position, respectively, according to one embodiment.

FIG. 9A shows the slicing assembly frame 4010 is in the slicing position where an angle 9010 between the first linkage 6050 and the second linkage 6060 is about 90 degrees. A complemental angle 9020 between the second linkage 6060 and the slicing assembly frame 4010 is also about 90 degrees. However, as discussed above, this angle may differ by about three degrees.

Figure 9B:
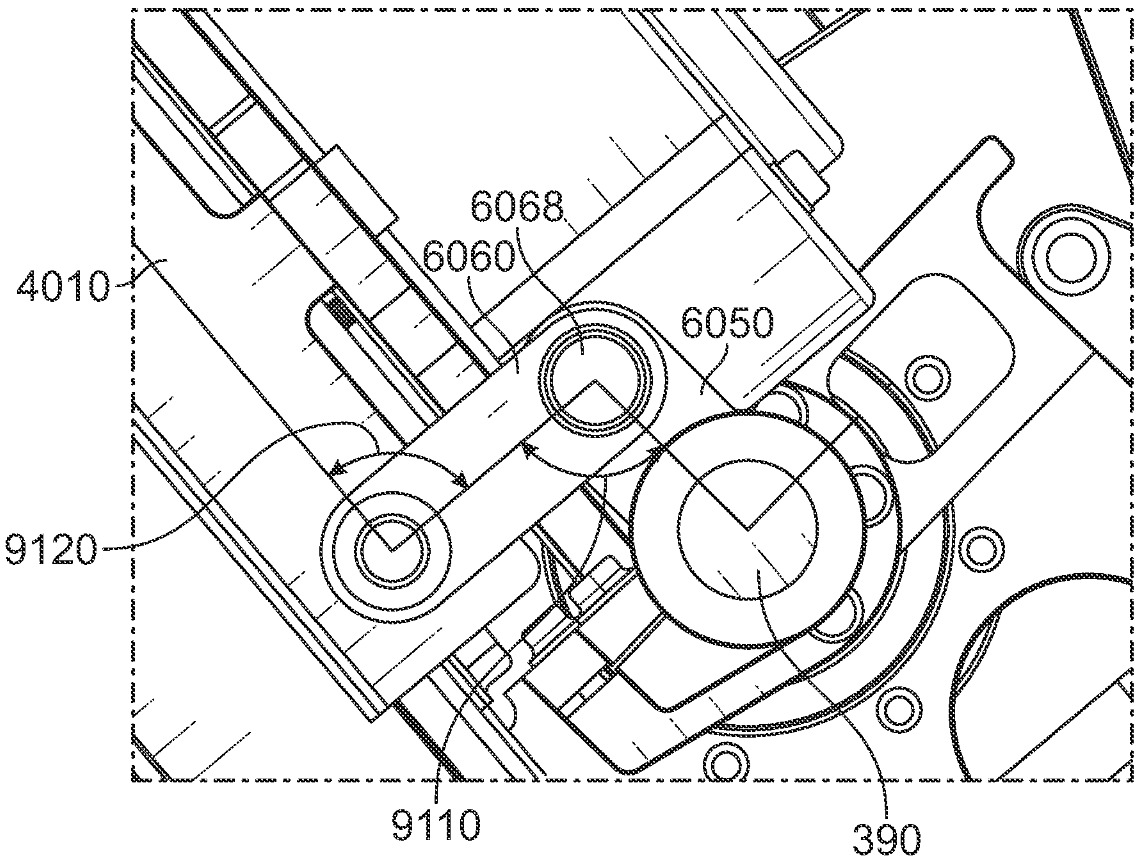

FIG. 9B shows the slicing assembly frame 4010 is in the clearance position where an angle 9110 between the first linkage 6050 and the second linkage 6060 is about 95.9 degrees. A complemental angle 9120 between the second linkage 6060 and the slicing assembly frame 4010 is about 89.6 degrees. However, as discussed above, this angle may differ by about three degrees. In this clearance position, the blade 344 is angled away from the cutting plane and shear bar 340 and not cutting is performed even though the blade continues to spin.

When the lower drive shaft 390 has been rotated in the counter-clockwise direction as viewed from the perspective of FIG. 9B to move into the clearance position, the blade 344 moves, for example in one embodiment, about 10 degrees or less, so that the slicing assembly frame 4010 is moved into the clearance position where the blade is away from the cutting plane of the food product.

While a particular embodiment is illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiment illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A food slicing system having a main frame, the system comprising:

an input conveyor configured to transport a food product for slicing;

an output conveyor configured to receive thereon, sliced food product;

a blade reciprocating assembly located between the input conveyor and the output conveyor;

the blade reciprocating assembly further comprising:

a support frame;

a rotating cutting blade mounted to the support frame;

a motor mounted on the support frame configured to operatively drive the cutting blade;

an upper support shaft operatively coupled to the main frame at opposite ends thereof;

the upper support shaft coupled to an upper portion of the support frame and configured to support the support frame and permit pivotal movement of the support frame about the upper support shaft;

a servomotor actuator fixedly coupled to the main frame and configured to rotationally drive a drive shaft, the drive shaft supported by a bearing at an end of the drive shaft located away from the servomotor actuator;

a gear box or reducer operatively coupled between the drive shaft and the servomotor actuator; and at least one set of linkage elements, each set of linkage elements operatively coupled to the drive shaft at a first end of the linkage elements and operatively coupled to a lower portion of the support frame at a second end of the linkage elements, the linkage elements configured to convert rotational motion of the drive shaft to pivoting movement of support frame about the upper support shaft.

2. The food slicing system according to claim 1, wherein when the blade reciprocating assembly is in the slicing position, a plane of the cutting blade is substantially co-planar with a cutting plane of the food product, and the cutting blade is configured to slice the food product; and wherein when the blade reciprocating assembly is in the clearance position, the plane of the cutting blade is disposed at a predetermined angle away from the cutting plane of the food product, and the cutting blade does not contact the food product.

3. The food slicing system according to claim 1, wherein the gear box or reducer is a planetary gear arrangement.

4. The food slicing system according to claim 1, wherein the gear box or reducer translates forward rotation and reverse rotation of the servomotor actuator into corresponding forward rotation and reverse rotation of the drive shaft, wherein rotation of the drive shaft is limited to a plus and minus 10 degree angular displacement.

5. The food slicing system according to claim 1, wherein the at least one set of linkage elements comprise:

a first linkage having first and second ends, the first end of the first linkage fixedly coupled to the drive shaft;

a second linkage having first and second ends, the first end of the second linkage pivotally coupled to the lower portion of the support frame; and wherein the second end of the first linkage is pivotally coupled to the second end of the second linkage.

6. The food slicing system according to claim 5, wherein the at least one set of linkage elements include a first set of two linkages located at a leftward lateral portion of the drive shaft, and a second set of two linkages located at a rightward lateral portion of the drive shaft.

7. The food slicing system of claim 1, wherein when the blade reciprocating assembly is in the clearance position, the plane of the cutting blade is disposed at an angle of between 2 degrees and 10 degrees away from the cutting plane of the food product.

8. The food slicing system of claim 1, wherein when the blade reciprocating assembly is in the slicing position, the plane of the cutting blade is substantially co-planar with the cutting plane of the food product within a tolerance of between +0.50 degrees and −0.50 degrees.

9. The food slicing system of claim 5, wherein an angle between the first linkage and the second linkage when the blade reciprocating assembly is in the slicing position differs from an angle between the first linkage and the second linkage when the blade reciprocating assembly is in the clearance position, in a range of between 4 degrees and 12 degrees.

10. The food slicing system of claim 1, wherein the blade reciprocating assembly is moved from the slicing position to the clearance position after a sliced stack having a predetermined number of slices, is produced.

11. A food slicing system comprising:

a blade reciprocating assembly mounted to a main frame of the food slicing system;

the blade reciprocating assembly further comprising:

a support frame;

a rotating cutting blade mounted to the support frame;

a motor mounted on the support frame configured to operatively drive the cutting blade;

an upper support shaft operatively coupled to the main frame at opposite ends thereof;

the upper support shaft coupled to an upper portion of the support frame and configured to support the support frame and permit pivotal movement of the support frame about the upper support shaft;

a drive shaft operatively coupled to the main frame between a bearing and a servomotor actuator, the drive shaft rotationally driven by the servomotor actuator;

a gear box or reducer operatively coupled between the drive shaft and the servomotor actuator; and at least one set of linkage elements, each set of linkage elements operatively coupled to the drive shaft at a first end of the linkage elements and operatively coupled to a lower portion of the support frame at a second end of the linkage elements, wherein the linkage elements are configured to reciprocally move the blade reciprocating assembly between a slicing position and a clearance position, and wherein the support frame pivots about the upper support shaft during the reciprocal movement.

12. The food slicing system according to claim 11, wherein when the blade reciprocating assembly is in the slicing position, a plane of the cutting blade is substantially co-planar with a cutting plane of the food product, and the cutting blade is configured to slice the food product; and wherein when the blade reciprocating assembly is in the clearance position, the plane of the cutting blade is disposed at a predetermined angle away from the cutting plane of the food product, and the cutting blade does not contact the food product.

13. The food slicing system according to claim 11, wherein the gear box or reducer is a planetary gear arrangement.

14. The food slicing system according to claim 11, wherein the gear box or reducer translates forward rotation and reverse rotation of the servomotor actuator into corresponding forward rotation and reverse rotation of the drive shaft, wherein rotation of the drive shaft is limited to a plus and minus 10 degree angular displacement.

15. The food slicing system according to claim 11, wherein the at least one set of linkage elements comprise:

a first linkage having first and second ends, the first end of the first linkage fixedly coupled to the drive shaft;

a second linkage having first and second ends, the first end of the second linkage pivotally coupled to the lower portion of the support frame; and wherein the second end of the first linkage is pivotally coupled to the second end of the second linkage.

16. The food slicing system according to claim 15, wherein the at least one set of linkage elements include a first set of two linkages located at a leftward lateral portion of the drive shaft, and a second set of two linkages located at a rightward lateral portion of the drive shaft.

17. A blade reciprocating assembly for a food slicing system comprising:

a support frame;

a rotating cutting blade mounted to the support frame;

a motor mounted on the support frame configured to operatively drive the cutting blade;

an upper support shaft operatively coupled between main support arms or plates at opposite ends thereof;

the upper support shaft coupled to an upper portion of the support frame and configured to support the support frame and permit pivotal movement of the support frame about the support shaft and relative to the main support arms;

a drive shaft operatively coupled to the main support arms or plates by a bearing at a first end and by a servomotor actuator at a second end, the drive shaft rotationally driven by the servomotor actuator;

a gear box or reducer operatively coupled between the drive shaft and the servomotor actuator; and at least one set of linkage elements, each set of linkage elements operatively coupled to the drive shaft at a first end of the linkage elements and operatively coupled to a lower portion of the support frame at a second end of the linkage elements, wherein the linkage elements are configured to reciprocally move the blade reciprocating assembly between a slicing position and a clearance position, and wherein the support frame pivots about the support shaft during the reciprocal movement.

18. The assembly according to claim 17, wherein the at least one set of linkage elements comprise:

a first linkage having first and second ends, the first end of the first linkage fixedly coupled to the drive shaft;

a second linkage having first and second ends, the first end of the second linkage pivotally coupled to the lower portion of the support frame; and wherein the second end of the first linkage is pivotally coupled to the second end of the second linkage.

* * * * *